United States Patent [19]
Detela

[11] Patent Number: 5,712,521
[45] Date of Patent: Jan. 27, 1998

[54] HYBRID SYNCHRONOUS MACHINE WITH TRANSVERSE MAGNETIC FLUX

[76] Inventor: Andrej Detela, Vogelna 4, 61000 Ljubljana, Slovenia

[21] Appl. No.: 980,457

[22] Filed: Nov. 23, 1992

[30] Foreign Application Priority Data

Nov. 22, 1991 [SI] Slovenia .................. 91 00008

[51] Int. Cl.$^6$ .................................................. H02L 37/12
[52] U.S. Cl. .................... 310/162; 310/261; 310/269
[58] Field of Search .......................... 310/162, 164, 310/163, 165, 67 R, 269, 90, 156, 154, 181, 254, 49 R, 261

[56] References Cited

U.S. PATENT DOCUMENTS

| | | | |
|---|---|---|---|
| 3,206,623 | 9/1965 | Snowdon | 310/162 |
| 3,469,131 | 9/1969 | Stellwagen | 310/162 |
| 3,614,496 | 10/1971 | Scheithart | 310/162 |
| 3,777,196 | 12/1973 | Field, II | 310/156 |
| 4,629,924 | 12/1986 | Grosjean | 310/156 |
| 4,672,247 | 6/1987 | Madser | 310/154 |
| 4,737,201 | 4/1988 | Brigham | 310/156 |
| 4,782,259 | 11/1988 | Shikama | 310/156 |
| 4,920,294 | 4/1990 | Christiaens | 310/162 |
| 5,128,570 | 7/1992 | Isozaki | 310/49 R |

FOREIGN PATENT DOCUMENTS

| | | |
|---|---|---|
| 3401163 | 11/1984 | Germany. |
| 34 01 163 C2 | 3/1987 | Germany. |

OTHER PUBLICATIONS

H. Weh, H. May, M. Shalaby; "Highly Effective Magnetic Circuits for Permanent Magnet Excited Synchronous Machines"; Int. Conference on El. Machines, Cambridge, MA.; 13–15 Aug. 1990; pp. 1040–1045.

*Primary Examiner*—Steven L. Stephan
*Attorney, Agent, or Firm*—Hertbert Dubno

[57] ABSTRACT

A hybrid synchronous machine with transverse magnetic flux, whose structure provides smaller ohmic losses and a higher efficiency than in conventional motors with high torque per machine weight. Each phase of the hybrid synchronous machine with transverse magnetic flux according to the invention is fitted with two rings of ferromagnetic material which are cogged on the circumference on both sides, between which a magnetized disk is inserted transversally to the direction of the stator winding, and the assembly thus formed is fixed to the rotor armature with the cogged rings being axially shifted between each other. The described structure of the hybrid synchronous machine with transverse magnetic flux solves the technical problem of high density of transverse magnetic field in the air gap, and also effectively solves the problem of installing permanent rotor magnets by means of a magnetized disk instead of individual inserted magnets.

3 Claims, 2 Drawing Sheets

HYBRID SYNCHRONOUS MACHINE WITH TRANSVERSE MAGNETIC FLUX

FIELD OF THE INVENTION

The present invention relates to a Hybrid Synchronous Machine with Transverse Magnetic Flux whose structure is such that it provides smaller ohmic losses and a higher efficiency than conventional motors with high torque per machine weight.

More particularly, it is a goal of the invention to provide a hybrid machine with transverse magnetic flux in which a high density of magnetic field in the air gap can be achieved and in which permanent magnetic are mounted so as to allow high tangential speed or the rotor.

BACKGROUND OF THE INVENTION

Hybrid electric machines that have a stator winding running coaxially around the main axis of the machine are already known. The stator winding mounted in this way produces a transverse magnetic flux. A similar solution is described by H. Weh, H. May and M. Shalaby in their article "Highly Effective Magnetic Circuits for Permanent Magnet Excited Synchronous Machines", International Conference on Electric Machines, Cambridge Mass., 13–15 Aug. 1990, p.p. 1040–1045.

The electric machine described in the above article offers a partial solution to the technical problem attacked by the invention as far as ohmic losses are concerned, its winding being designed to produce transverse magnetic flux. The machine as described in this article has, due to the low density of the magnetic field of permanent magnets (their being installed centrally, one beside the other along the rotor circumference, so that magnetization runs in the radial direction), a comparatively low torque, while in an improved version, which is also described by the article, the magnets are arranged so as to produce an effect called "the concentration of magnetic flux". Such "concentration of magnetic flux" in machines whose stator windings do not produce transverse magnetic flux is also described in German patent document DE 34 01 163.

In the machine described in the above article permanent magnets are placed in upright position (i.e. shifted by 90° with regard to the position of permanent magnets in the first case, so that the magnetization in the magnets runs in tangential direction). In this solution, the magnets are placed into or fixed to the recesses in the rotor.

Permenent magnets mounted in this way produce a magnetic field of greater density, and a machine with this rotor has a good torque per weight. A drawback of this system is the mode of installation of the great number of permanent magnets; these can be glued or otherwise fixed to the rotor supporting ring. The position of permanent magnets being such that they can only be glued or attached by their smallest surface, this solution is not recommended for high tangential speeds of the rotor. The fact that the magnets to be installed have to be magnetized in advance presents a certain technical problem, especially due to the great number of magnets and to the relatively high density of magnetic energy.

SUMMARY OF THE INVENTION

The Hybrid Synchronous Machine with Transverse Magnetic Flux which is the subject of this Invention, consists (one phase) of two rings of soft magnetic material which are cogged on the circumference on both sides, between which a magnetized disk is inserted transversally to the direction of the stator winding, and the entire assembly thus formed is fixed to the rotor armature in such a way that the cogged rings are axially shifted between each other.

According to the invention, the rotor and stator is in each phase fitted with at least one ring-shaped magnet which lies coaxially with the main axis of the electric machine, whereas on each side of the magnet there is a magnetically coupled ferromagnetic ring with two symmetrical circles or arrays of evenly spaced poles, while the stator or rotor has an equal number of salient ferromagnetic poles.

Depending on the number of phases, an adequate number of rotor assemblies is fixed to the rotor armature, the assembly consisting of cogged rings of soft magnetic material between which a magnetic disc is placed, magnetized in the direction from the ring to the ring or in the opposite direction, while the stator poles of the yokes are magnetically coupled with the rotor poles of the cogged rings. The cogged rings are fitted on the outer circumference with rotor poles and on the inner circumference with rotor poles and the cogged rings tied together in a rotor assembly are tangentially shifted between each other by one half of a pole division, i.e. one array is shifted relative to the other array depending on the number of phases, to the stator armature an adequate number of stator assemblies is fixed, consisting of cogged rings of soft magnetic material between which a magnetic disc is placed magnetized in the direction from the ring to the ring, or in the opposite direction, while the salient poles of the rotor are magnetically coupled with the stator poles of the cogged rings and the winding is divided into two symmetrical parts installed in the center of each stator ring. Thus, where there are a plurality of electrical phases, a respective stator assembly is provided for each.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
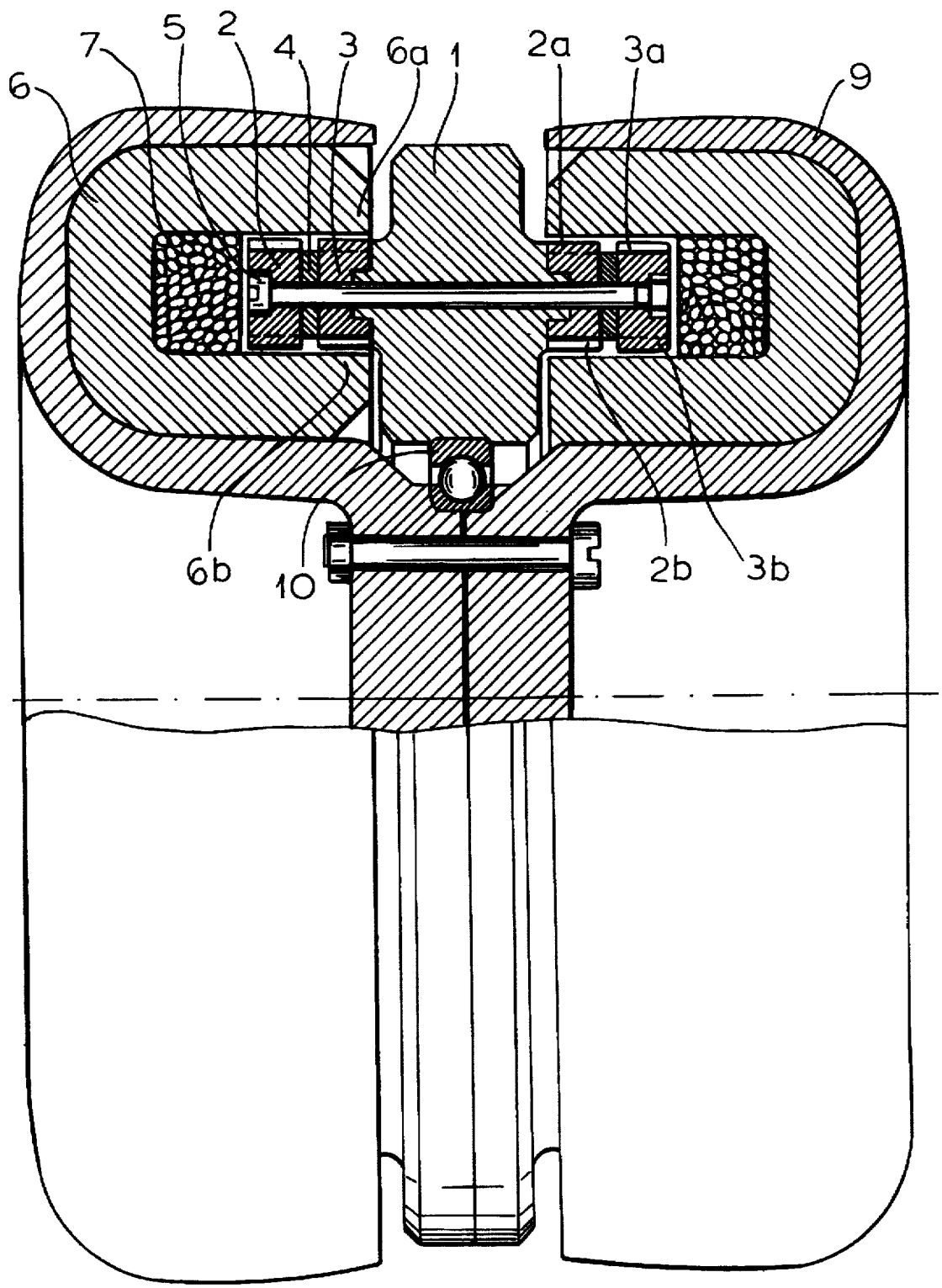
FIG. 1 is a cross section of a two-phase Hybrid Machine with Transverse Magnetic Flux according to the Invention.
Figure 2:
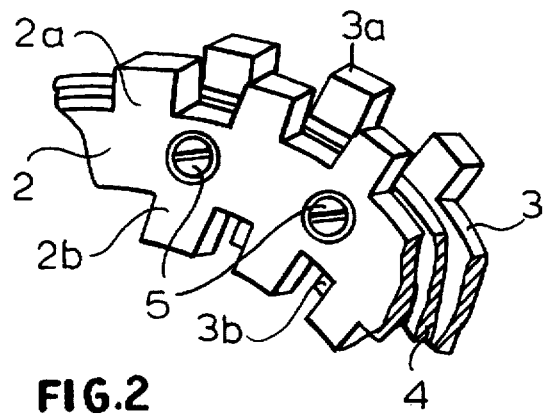
FIG. 2 is a perspective view of a part of rotor assembly In partial cross-section.

A two-phase version of the Hybrid Machine with Transverse Magnetic Flux according to the invention is shown in FIG. 1. To each side of the rotor armature 1, which is rotable on a bearing 10, an assembly is fixed consisting of two cogged rings 2, 3 of ferromagnetic material fitted with rotor poles 2a, 2b, 3a, 3b (FIG. 2) and a magnetized disk 4. The cogged rings 2, 3 and the magnetized disk 4 can be held together by means of screws 5, as shown in FIG. 2. The cogged rings 2, 3 in the assembly are placed so that their poles 2a, 3a are mutually shifted , as shown in FIG. 2. The same applies to the poles 2b, 3b. The magnetized disk 4 is magnetized so as to produce a magnetic flux that can be directed either from the cogged ring 3 to the cogged ring 2 or in the opposite direction.

In the magnetic juncture with the cogged rings 2, 3 and the magnetized disk 4 lie stator poles 6a, 6b of yokes 6 which encircle the stator winding 7. The number of stator poles (6a) equals the number of rotor poles 2a, 3a of the cogged rings 2, 3.

At a chosen moment of observation, when the stator pole 6a covers the rotor pole 3a and, due to the angularly offset of the cogged ring 3 with respect to the cogged ring 2, the stator pole 6b covers the rotor pole 2b, a current starts running in the winding 7 in such direction that the density of magnetic field in the gap between the stator pole 6a and the rotor pole 3a of the cogged ring 3, and between the stator pole 6b and the rotor pole 2b of the cogged ring 2 decreases, while the density of magnetic field in the gaps between the stator pole 6a and the rotor pole 2a of the cogged ring 2 and between the stator pole 6b and the rotor pole 3b of the cogged ring 3 increases. Because of this instantaneous magnetic state the stator poles attract the rotor poles in a position which is shifted by ½ of the pole's division with regard to the position at the chosen moment, so that at the end position of observation the stator pole 6b coincides with the rotor pole 3b of the cogged ring 3 and the stator pole 6a coincides with the rotor pole 2a of the cogged ring 2. At this moment the direction of current flow the winding 7 inverts. This causes the rotor to move forwards, so the it reassumes the initially observed position of mutual covering of the rotor and stator poles Through the change of current direction in the stator winding 7 the rotation of rotor is enabled, while the change itself can be achieved by electronic commutation.

Figure 3:
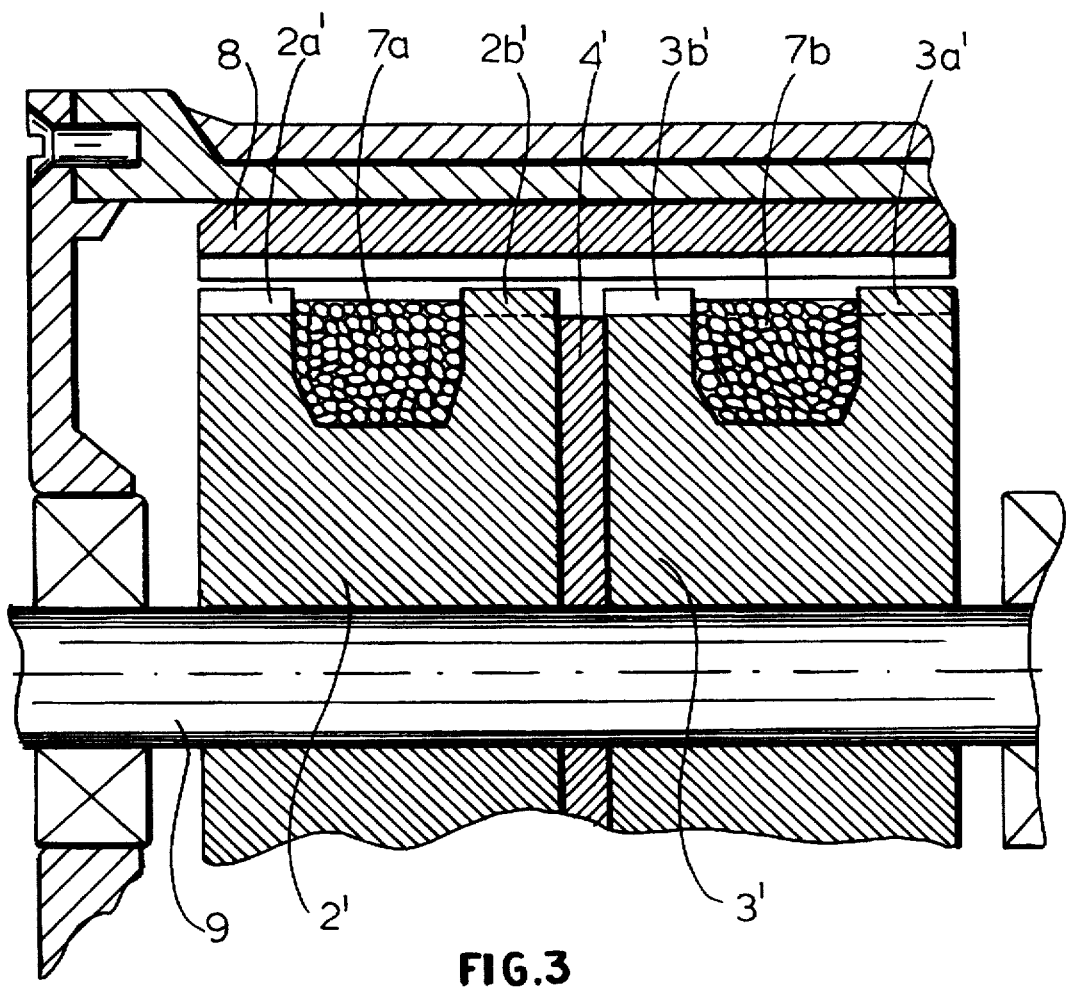
FIG. 3 is a cross-section of the Hybrid Synchronous Machine with Transverse Magnetic Flux according to a second variant.

In the second variant H (FIG.3) a Hybrid Synchronous Machine with Transverse Magnetic Flux is shown with the cogged rings 2', 3" on the stator shaft 9. In the center of each ring 2', 3" there is one half 7a, 7b of a coaxial winding. With such installation the Synchronous Machine according to the invention can be designed with an external rotor, where the salient poles of the rotor 8 are cogged along the entire axis and in the same pole division as the salient poles 2a', 2b', 3a', 3b" of the cogged rings 2', 3" separated by the magnetized disk 4.

The described structure of Hybrid Synchronous Machine with Transverse Magnetic Flux solves the technical problem of great density of transverse magnetic flux and, with the introduction of the magnetized disk 4 (FIGS. 1 and 2) effectively solves the problem of installing permanent rotor magnets.

What we claim is:

1. A hybrid synchronous machine with transverse flux, said machine comprising:
   means defining an axis of rotation;
   a rotor member journaled for rotation about said axis; and
   an annular stator member, continuously surrounding said axis and juxtaposed with said rotor member,
      said rotor member comprising:
         a pair of axially spaced annular ferromagnetic bodies formed with respective symmetrical circular arrays of equal numbers of equispaced radially projecting poles along both inner and outer peripheries of the rotor member, the poles of one array being angularly offset about said axis from the poles of the other array, and
         at least one ring-shaped permanent magnet coaxial with said bodies and disposed between said bodies while being magnetically coupled to said bodies,
      said stator member comprising:
         respective ferromagnetic bodies flanking said rotor member and having a number of equispaced salient magnetic poles equal in number to the poles of said arrays and juxtaposed therewith, and a respective annular coil surrounding the axis and individual to each of said ferromagnetic bodies and received therein with each ferromagnetic body forms an annular yoke around the respective coil .

2. The hybrid synchronous machine defined in claim 1 wherein said machine operates with a plurality of electrical phases and said rotor member, for each of said phases of the machine, comprises two ferromagnetic rings formed with respective circular arrays of cogs along respective inner and outer peripheries and forming said pair of annular axially spaced ferromagnetic bodies, said ring-shaped permanent magnet being a magnetized disk received between said rings, said stator member having axially extending portions flanking said inner and outer peripheries.

3. The hybrid synchronous machine defined in claim 2 wherein the cogs of said rings are angularly offset by half of a separation of said cogs along said arrays.

* * * * *